United States Patent
Sahota et al.

(10) Patent No.: US 11,085,453 B2
(45) Date of Patent: Aug. 10, 2021

(54) HIGH PRESSURE COMPRESSOR FOR AN ENGINE

(71) Applicant: MTU Aero Engines AG, Munich (DE)

(72) Inventors: Harsimar Sahota, Unterschleissheim (DE); Alexander Halcoussis, Haimhausen (DE); Sergio Elorza Gomez, Munich (DE)

(73) Assignee: MTU Aero Engines AG, Munich (DE)

( * ) Notice: Subject to any disclaimer, the term of this patent is extended or adjusted under 35 U.S.C. 154(b) by 93 days.

(21) Appl. No.: 16/518,057

(22) Filed: Jul. 22, 2019

(65) Prior Publication Data

US 2020/0024948 A1   Jan. 23, 2020

(30) Foreign Application Priority Data

Jul. 23, 2018   (DE) .................. 10 2018 212 176.1

(51) Int. Cl.
| | | |
|---|---|---|
| *F04D 19/02* | (2006.01) | |
| *F01D 1/10* | (2006.01) | |
| *F04D 29/54* | (2006.01) | |
| *F04D 29/18* | (2006.01) | |
| *F02C 3/06* | (2006.01) | |

(52) U.S. Cl.
CPC .............. *F04D 19/02* (2013.01); *F01D 1/10* (2013.01); *F02C 3/06* (2013.01); *F04D 29/181* (2013.01); *F04D 29/541* (2013.01)

(58) Field of Classification Search
CPC ..... F01D 1/10; F02C 3/06; F04D 3/00; F04D 19/02; F04D 29/181; F04D 29/541; F05D 2250/30
See application file for complete search history.

(56) References Cited

U.S. PATENT DOCUMENTS

| 7,367,775 B2 * | 5/2008 | Borufka | F01D 5/142 |
|---|---|---|---|
| | | | 415/119 |
| 9,605,541 B2 * | 3/2017 | Geppert | F01D 5/10 |
| 2011/0123342 A1 | 5/2011 | Topol | |

(Continued)

FOREIGN PATENT DOCUMENTS

| DE | 10326533 A1 | 1/2005 |
|---|---|---|
| DE | 102006060694 A1 | 6/2008 |

(Continued)

OTHER PUBLICATIONS

Thaddeus Fowler: "Jet Engines and Propulsion Systems for Engineers", Jan. 1, 1989, pp. 1, 2, 106-108.

*Primary Examiner* — Kenneth Bomberg
*Assistant Examiner* — Christopher R Legendre
(74) *Attorney, Agent, or Firm* — Barlow Joseph and Holmes Ltd; David Josephs

(57) ABSTRACT

An engine, having a first, second, third and fourth quasi-stage, each with a stator and a downstream rotor, wherein a particular blade/vane solidity in the center section is in the first quasi-stage, at least 1.04 and at most 1.16 for the stator and at least 1.46 and at most 1.67 for the rotor; in the second quasi-stage, at least 1.13 and at most 1.32 for the stator and at least 1.32 and at most 1.61 for the rotor; in the third quasi-stage, at least 1.20 and at most 1.39 for the stator and at least 1.16 and at most 1.41 for the rotor; in the fourth quasi-stage, at least 1.37 and at most 1.63 for the stator and at least 1.15 and at most 1.41 for the rotor.

15 Claims, 3 Drawing Sheets

| 1. QS | Stator | 1.16 | 39 |
|---|---|---|---|
| | Rotor | 1.63 | 26 |
| 2. QS | Stator | 1.26 | 44 |
| | Rotor | 1.46 | 36 |
| 3. QS | Stator | 1.33 | 54 |
| | Rotor | 1.29 | 50 |
| 4. QS | Stator | 1.48 | 78 |
| | Rotor | 1.28 | 54 |

(56) References Cited

U.S. PATENT DOCUMENTS

| | | |
|---|---|---|
| 2016/0123236 A1 | 5/2016 | Walker et al. |
| 2016/0186773 A1 | 6/2016 | DiPietro, Jr. et al. |
| 2016/0201607 A1 | 7/2016 | Gallagher et al. |
| 2016/0265547 A1 | 9/2016 | Fulayter |
| 2016/0273547 A1 | 9/2016 | Gallagher et al. |
| 2017/0114802 A1* | 4/2017 | Passrucker .............. F01D 5/141 |
| 2018/0023511 A1 | 1/2018 | Gallagher et al. |
| 2020/0024948 A1* | 1/2020 | Sahota ...................... F02C 3/06 |

FOREIGN PATENT DOCUMENTS

| | | |
|---|---|---|
| EP | 1712738 A2 | 10/2006 |
| EP | 2696078 A1 | 2/2014 |
| EP | 1772596 B1 | 3/2014 |
| EP | 3290643 A1 | 3/2018 |
| WO | 2015078428 A1 | 6/2015 |

* cited by examiner

| 1. QS | Stator | 1.16 | 39 |
|---|---|---|---|
|  | Rotor | 1.63 | 26 |
| 2. QS | Stator | 1.26 | 44 |
|  | Rotor | 1.46 | 36 |
| 3. QS | Stator | 1.33 | 54 |
|  | Rotor | 1.29 | 50 |
| 4. QS | Stator | 1.48 | 78 |
|  | Rotor | 1.28 | 54 |

HIGH PRESSURE COMPRESSOR FOR AN ENGINE

BACKGROUND OF THE INVENTION

The present invention relates to a high pressure compressor for an engine.

Functionally, the engine is divided into compressor, combustion chamber, and turbine. In this case, aspirated air is compressed in the compressor and burned in the downstream combustion chamber with kerosene mixed in. The hot gas that arises, a mixture of combustion gas and air, flows through the downstream turbine and is thereby expanded. Energy is also withdrawn proportionally thereby from the flowing gas in order to drive the compressor, or in the case of a turbofan engine, also the fan. The present subject is directed first to a module of the compressor, namely the high pressure compressor.

SUMMARY OF THE INVENTION

The present invention is based on the technical problem of providing a particularly advantageous high pressure compressor for an engine.

This is achieved according to the invention by the high pressure compressor according to the present invention. This compressor has four quasi-stages (QS) following one another, each with a stator and a downstream rotor that are characterized by the following blade/vane densities or solidities in the center section at half channel height:

TABLE 1

|  |  | min | max |
|---|---|---|---|
| $1^{st}$ QS | Stator | 1.04 | 1.19 |
|  | Rotor | 1.46 | 1.67 |
| $2^{nd}$ QS | Stator | 1.13 | 1.32 |
|  | Rotor | 1.32 | 1.61 |
| $3^{rd}$ QS | Stator | 1.2 | 1.39 |
|  | Rotor | 1.16 | 1.41 |
| $4^{th}$ QS | Stator | 1.37 | 1.63 |
|  | Rotor | 1.15 | 1.41 |

The blade/vane solidity is the reciprocal of the division ratio S/L (the division ratio is the ratio of the circumferential spacing of the blades/vanes to the blade/vane chord length). When considering the presently indicated blade/vane solidities, the values of the $2^{nd}$ and $3^{rd}$ quasi-stages especially clearly lie below the values that would be initially assumed with regard to a stable design. In a conventional approach, one would establish the blade/vane solidity therein as at least 10% higher for the rotors, and in the case of the stators it is also several percent higher. Conversely, in such a reference design that would result according to conventional criteria, the blade/vane solidity of the stator of the $4^{th}$ quasi-stage would be somewhat smaller than the one presently determined. It was established, however, that the specified decreases in the front quasi-stages will be possible due to a certain increase or displacement of the blade/vane solidity into the back region, whereby stability is still always sufficiently achieved (a partial load that is particularly critical will be considered thereby).

In general, the reduction in the blade/vane solidity is of advantage with respect to efficiency. The smaller the blade/vane solidity is, the smaller the wetted surface is, and also, the smaller will be the friction losses. A reduction in the fuel or kerosene consumption, however, may not only result within the context of efficiency, but also as a consequence of a lower weight based on the smaller blade/vane solidity. Especially for the stators, a cost savings is also possible, insofar as the smaller blade/vane solidity or smaller number of blades or vanes also can mean a smaller number of components, which will be particularly relevant in the case of adjustable stators. Preferably, at least the front stages are equipped with adjustable stators.

The reduction of the blade/vane solidities in the $2^{nd}$ and $3^{rd}$ quasi-stage can thus be of advantage for different reasons. Somewhat simplified, to sum up, this advantageous design of the 2nd and $3^{rd}$ quasi-stages is made possible by an increase and thus at first glance a disadvantageous (when considered alone) design of the $4^{th}$ quasi-stage.

Preferred embodiments are found in the entire description, wherein the presentation of the features does not always distinguish individually between device or method aspects. In particular, it always relates to both the high pressure compressor as well as the entire compressor or also an engine comprising it.

The quasi-stages referenced in the present text are each constructed of a stator having a rotor following it in the direction of flow of the compressor gas. In an alternative approach, the stator of the $1^{st}$ quasi-stage could be considered to be an inlet guide vane, and the rotor-stator pairs following thereupon could each be considered to be a stage (the particular stator follows the rotor in these stages).

In the preferred embodiment, the blade/vane solidities of the first four quasi-stages lie in the following ranges:

TABLE 2

| $1^{st}$ Qs | Stator | 1.14 to 1.18, in particular 1.16 |
|  | Rotor | 1.61 to 1.65, in particular 1.63 |
| $2^{nd}$ QS | Stator | 1.24 to 1.28, in particular 1.26 |
|  | Rotor | 1.44 to 1.48, in particular 1.46 |
| $3^{rd}$ Qs | Stator | 1.31 to 1.35, in particular 1.33 |
|  | Rotor | 1.27 to 1.31, in particular 1.29 |
| $4^{th}$ QS | Stator | 1.46 to 1.50, in particular 1.48 |
|  | Rotor | 1.26 to 1.30, in particular 1.28 |

In preferred embodiment, the blade/vane solidities of the stators are not distributed equidistantly over the circumference, which can help prevent, for example, extrinsic, intermediate, or intrinsic stimuli. In this case, referred to the installed position of the high pressure compressor, thus referred to the engine installed on the airplane, a distinction is made between the lower half of the stator (bottom) and the upper half (top). Preferably, the following allocation of the blade/vane solidities can be present in this case:

TABLE 3

|  | bottom | | top | |
|---|---|---|---|---|
|  | min | max | min | max |
| Stator ($1^{st}$ QS) | 1.02 | 1.13 | 1.07 | 1.19 |
| Stator ($2^{nd}$ QS) | 1.19 | 1.37 | 1.08 | 1.26 |
| Stator ($3^{rd}$ QS) | 1.16 | 1.37 | 1.25 | 1.41 |
| Stator ($4^{th}$ QS) | 1.41 | 1.67 | 1.34 | 1.58 |

In a preferred embodiment, the blade/vane solidities indicated in Table 1 will be realized with the following numbers of blades/vanes, each of which is given in a range (min/max) and at a particularly preferred number:

TABLE 4

|  |  | min | max | preferred |
|---|---|---|---|---|
| 1st QS | Stator | 37 | 41 | 39 |
|  | Rotor | 24 | 28 | 26 |
| 2ndQS | Stator | 42 | 46 | 44 |
|  | Rotor | 34 | 38 | 36 |
| 3rdQS | Stator | 52 | 56 | 54 |
|  | Rotor | 48 | 52 | 50 |
| 4thQS | Stator | 76 | 80 | 78 |
|  | Rotor | 52 | 56 | 54 |

In general, the present high pressure compressor is preferably constructed from eight true stages and one inlet guide vane. In observing the quasi-stages, the inlet guide vane forms the stator of the $1^{st}$ quasi-stage. In the case of the present high pressure compressor, the number of vanes or blades of the $1^{st}$ stage can be comparatively low in comparison to the $8^{th}$ stage, whose rotor can preferably have 55 blades. A ratio of the number of blades of the rotor of the $8^{th}$ quasi-stage to the number of blades of the rotor of the $1^{st}$ quasi-stage can generally lie between 2 and 2.2, for example.

The invention also relates to a compressor having a presently disclosed high pressure compressor and a low pressure compressor. The high pressure compressor is preferably built up of eight stages; the low pressure compressor is constructed of three stages.

The invention also relates to an engine with a presently discussed compressor or high pressure compressor.

In preferred embodiment, the pressure ratio of the high pressure compressor has at most a proportion of 40% of the total pressure ratio of the entire compressor, wherein a proportion of at most 35% or 30% are further particularly preferred. Preferred lower limits may lie, for example, at least at 15%, 20% or 25% (increasingly preferred in the named sequence). In this case, the so-called cruise condition will be considered, which is also referred to as the Aero Design Point (ADP).

In a preferred embodiment, the high pressure compressor has a pressure ratio of at least 13, preferably at least 14. An upper limit may lie at most at 16. The first four stages of the high pressure compressor preferably have a pressure ratio of at most 6.5, preferably at most 6.1; a possible lower limit lies at least at 5.

The engine is a geared turbofan engine in preferred embodiment. The fan may have, for example, at least 18 and at most 25 as the number of blades/vanes, wherein about 20 blades/vanes are particularly preferred. Preferably, it is a dual-shaft engine. The ratio of fan diameter to compressor length can lie at about 2.2 (2.2+/−0.1); the ratio of compressor length to compressor diameter can lie at about 2.1 (2.1+/−0.1).

In preferred embodiment, the fan pressure ratio lies at 1.5 at most, preferably at about 1.4. The fan preferably involves a geared fan.

BRIEF DESCRIPTION OF THE DRAWINGS

In the following, the invention will be explained more closely on the basis of an exemplary embodiment, wherein the individual features in the scope of the independent or coordinated claims can also be essential to the invention in another combination, and wherein also no distinction is made individually between the different claim categories.

Taken individually.

DESCRIPTION OF THE INVENTION

Figure 1:
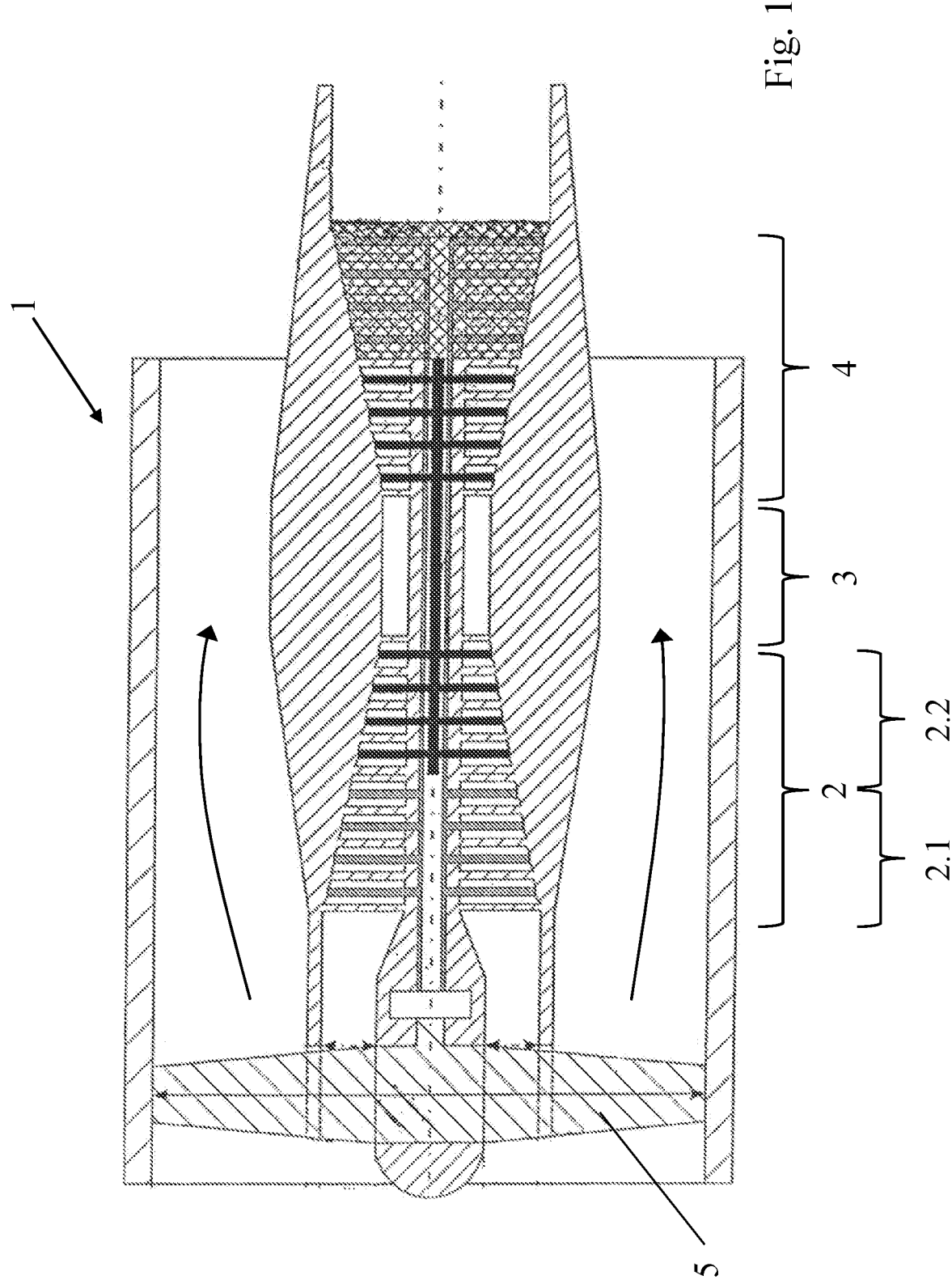
FIG. 1 shows a schematic axial section of a turbofan engine.

FIG. 1 shows a turbofan engine 1 in an axial section. Functionally, it is divided into compressor 2, combustion chamber 3, and turbine 4. Aspirated air is compressed in the compressor 2, which is built of a low pressure compressor 2.1 and a high pressure compressor 2.2. Then kerosene is mixed in with the air in the combustion chamber 3 and this mixture is combusted. The hot gas is expanded in the turbine 4, wherein energy is withdrawn proportionally from the hot gas (via the movement of the rotors). This energy is used for driving the rotors of the compressor 2 on the one hand, and for driving the fan 5, which essentially produces the thrust of the turbofan engine 1, on the other hand.

Figures 2, 3:
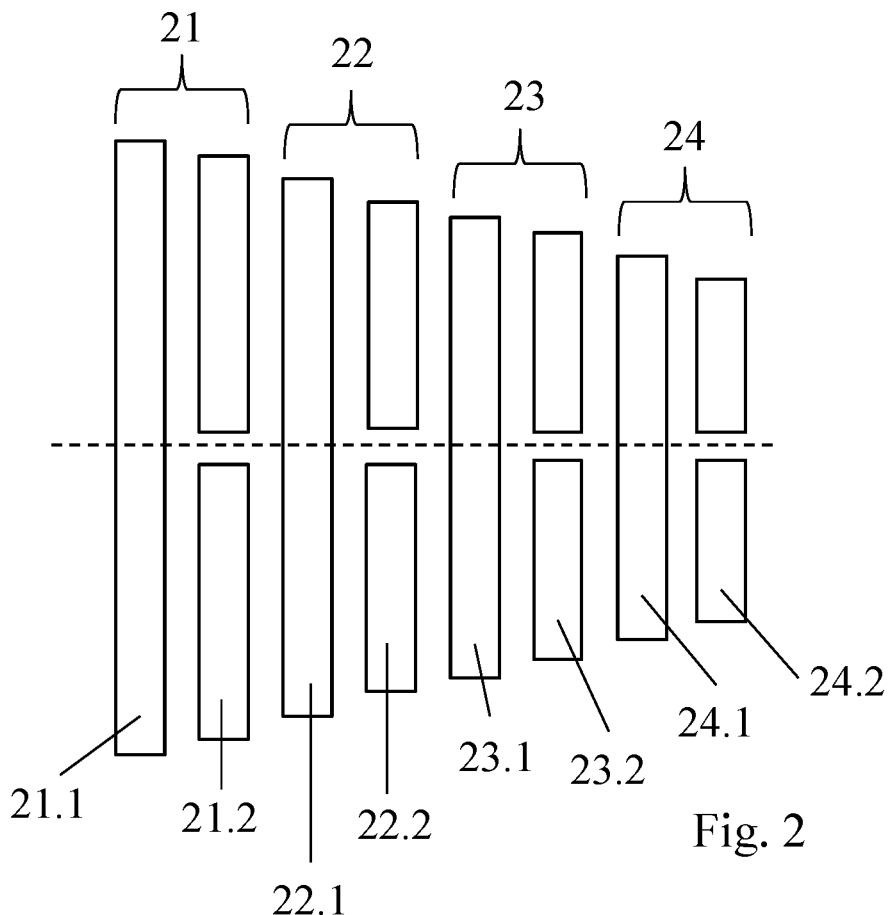
FIG. 2 shows, in a schematic illustration, a portion of a high pressure compressor according to the invention for a turbofan engine.
FIG. 3 shows the blade/vane solidities and numbers of blades/vanes of the first four quasi-stages of the high-pressure compressor according to FIG. 2.

FIG. 2 shows a portion of the high pressure compressor 2.2, namely the first four quasi-stages 21-24; overall, the high pressure compressor 2.2 is constructed of eight stages. Each of the quasi-stages 21-24 has a stator 21.1, 22.1, 23.1, 24.1 and a downstream rotor 21.2, 22.2, 23.2, 24.2. Alternatively, if stages of rotor and following stator were to be considered, the stator 21.1 would be considered to be an inlet guide vane (IGV).

The blade/vane solidities and numbers of blades/vanes of the quasi-stages 21-24 according to FIG. 2 are given in FIG. 3 (the blade/vane solidities in the third column and the number of blades/vanes in the fourth column). The values are clearly reduced in comparison to a conventional design, especially in the $2^{nd}$ and $3^{rd}$ quasi-stages 22, 23. They lie below what would usually be considered as necessary for the design of a stable compressor.

Figure 4:
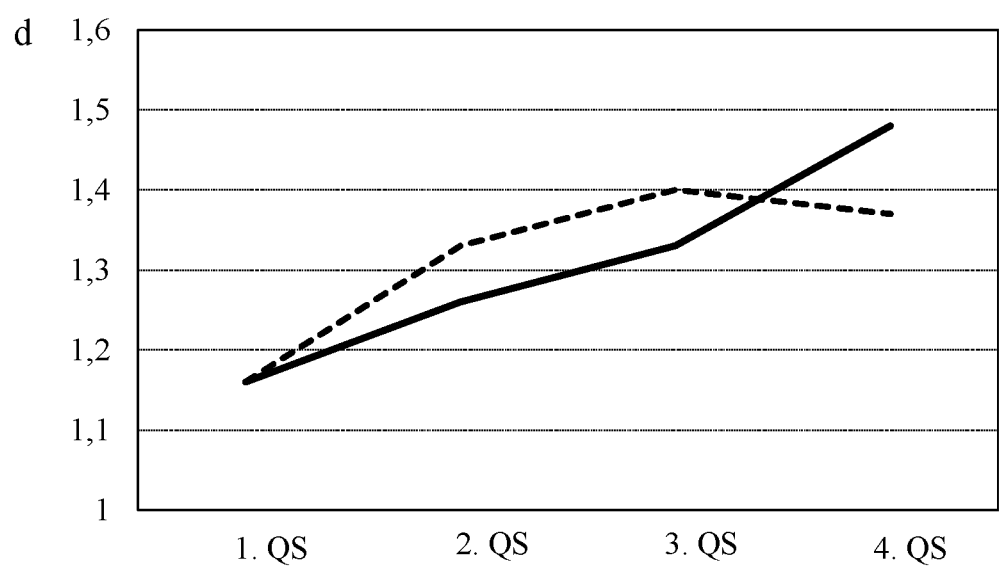
FIG. 4 shows in a diagram the vane solidity of the stators in the first four quasi-stages in comparison to a conventional design.

FIG. 4 shows the blade/vane solidity d of the stators in comparison to a conventional design. The solid line corresponds to the design according to the invention; the dashed line corresponds to the reference design. In addition to the decrease in the $2^{nd}$ and $3^{rd}$ quasi-stages 22, 23, it can also be recognized that the blade/vane solidity in the $4^{th}$ quasi-stage was somewhat increased. Reference is made to the remarks in the introduction to the description.

What is claimed is:

1. A high pressure compressor for an engine, comprising a first, second, third and fourth quasi-stage, each quasi-stage having a stator and a downstream rotor, wherein a blade/vane solidity in a respective center section of each quasi-stage is:

in the first quasi-stage, at least 1.04 and at most 1.18 for the stator and at least 1.46 and at most 1.67 for the rotor;

in the second quasi-stage, at least 1.13 and at most 1.32 for the stator and at least 1.32 and at most 1.61 for the rotor;

in the third quasi-stage, at least 1.20 and at most 1.39 for the stator and at least 1.16 and at most 1.41 for the rotor;

in the fourth quasi-stage, at least 1.37 and at most 1.63 for the stator and at least 1.15 and at most 1.41 for the rotor.

2. The high pressure compressor according to claim 1, wherein the blade/vane solidity in the center section is:

in the range of 1.14 to 1.18 for the stator of the first quasi-stage;

in the range of 1.24 to 1.28 for the stator of the second quasi-stage;

in the range of 1.31 to 1.35 for the stator of the third quasi-stage;

in the range of 1.46 to 1.50 for the stator of the fourth quasi-stage.

3. The high pressure compressor according to claim 1 wherein the blade/vane solidity in the center section is:

in the range of 1.61 to 1.65 for the rotor of the first quasi-stage;

in the range of 1.44 to 1.48 for the rotor of the second quasi-stage;

in the range of 1.27 to 1.31 for the rotor of the third quasi-stage;

in the range of 1.26 to 1.30 for the rotor of the fourth quasi-stage.

4. The high pressure compressor according to claim 1, wherein in a respective lower half of each of the respective stators, a blade/vane solidity of each respective quasi-stage is:

at least 1.02 and at most 1.13 in the first quasi-stage;

at least 1.19 and at most 1.37 in the second quasi-stage;

at least 1.16 and at most 1.37 in the third quasi-stage;

at least 1.41 and at most 1.67 in the fourth quasi-stage.

5. The high pressure compressor according to claim 1, wherein, in a respective upper half of each of the respective stators, a particular blade/vane solidity of each respective quasi-stage is:

at least 1.07 and at most 1.19 in the first quasi-stage;

at least 1.08 and at most 1.26 in the second quasi-stage;

at least 1.25 and at most 1.41 in the third quasi-stage;

at least 1.34 and at most 1.58 in the fourth quasi-stage.

6. The high pressure compressor according to claim 1, wherein a number of blades is:

in the first quasi-stage, at least 37 and at most 41 for the stator and at least 24 and at most 28 for the rotor;

in the second quasi-stage, at least 42 and at most 46 for the stator and at least 34 and at most 38 for the rotor;

in the third quasi-stage, at least 52 and at most 56 for the stator and at least 48 and at most 52 for the rotor;

in the fourth quasi-stage, at least 76 and at most 80 for the stator and at least 52 and at most 56 for the rotor.

7. The high pressure compressor according to claim 1, wherein a number of blades is:

39 for the stator of the first quasi-stage;

44 for the stator of the second quasi-stage;

54 for the stator of the third quasi-stage;

78 for the stator of the fourth quasi-stage.

8. The high pressure compressor according to claim 1, wherein a number of blades is:

26 for the rotor of the first quasi-stage;

36 for the rotor of the second quasi-stage;

50 for the rotor of the third quasi-stage;

54 for the rotor of the fourth quasi-stage.

9. A compressor, comprising, a high pressure compressor according to claim 1, wherein the compressor is constructed with a total of eight stages, and a three-stage low pressure compressor.

10. An engine, comprising, a compressor according to claim 9.

11. The engine according to claim 10, wherein a pressure ratio of the high pressure compressor to a total compressor pressure ratio of the compressor comprises a proportion of at most 40%.

12. The engine according to claim 10, comprising a compressor pressure ratio of at least 13 and at most 16, and a pressure ratio across the first, second, third, and fourth quasi-stages is at least 5 and at most 6.5.

13. The engine according to claim 10, having a geared turbofan.

14. The engine according to claim 13, wherein a ratio of a diameter of the geared turbofan to a length of the compressor is at least 2.

15. The engine according to claim 10 having a geared turbofan, wherein a fan pressure ratio is at most 1.5.

* * * * *